Feb. 4, 1936.  E. V. J. TOWER  2,029,516
TRANSMITTING ELEMENT
Filed May 2, 1930  2 Sheets-Sheet 1

INVENTOR
Elmer V. J. Tower
BY
ATTORNEYS

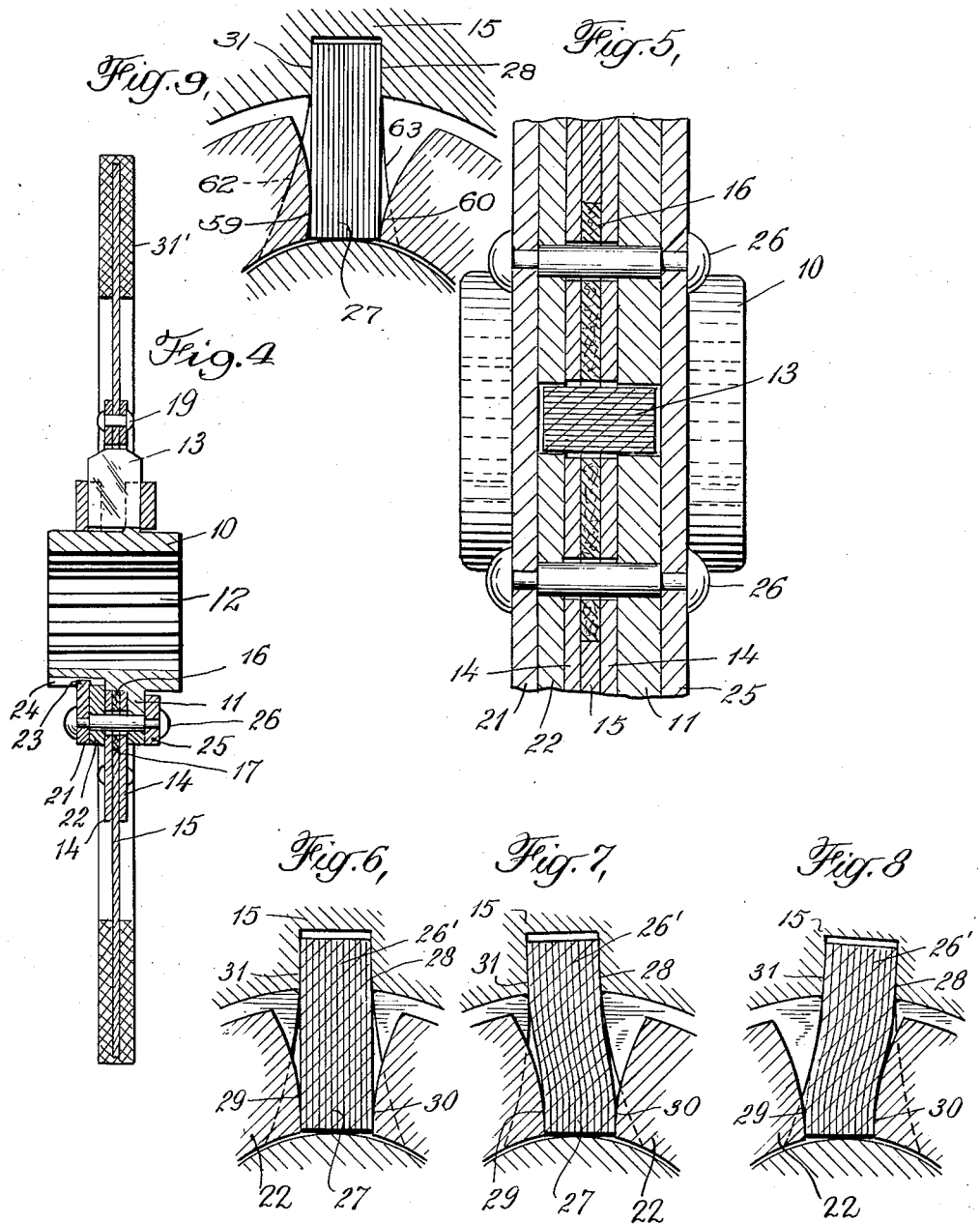

Patented Feb. 4, 1936

2,029,516

UNITED STATES PATENT OFFICE 2,029,516

TRANSMITTING ELEMENT

Elmer V. J. Tower, North Syracuse, N. Y., assignor, by direct and mesne assignments, of one-half to The Russell Manufacturing Company, Middletown, Conn., a corporation of Connecticut, and one-half to Brown-Lipe Gear Company, Toledo, Ohio, a corporation of New York Application May 2, 1930, Serial No. 449,207

4 Claims. (Cl. 192—68)

This invention relates to power transmitting elements of the flexible or shock-absorbing type adapted to absorb and dampen vibration received from the source of power and to prevent such vibration from being transmitted to the driven element. A transmitting element embodying the principles of the invention offers peculiar advantages when employed in a clutch of the type used in motor cars. Accordingly, an embodiment of the invention in the form of a clutch transmitting disc will be described in detail for purposes of illustration, although it is to be understood that the utility of the invention is not confined to that particular application of its principles. The new transmitting element may be employed in clutches either of the single disc or twin types, but I have illustrated and will describe a single disc clutch by way of example.

As is well known, automobile motors have periods at which torsional vibration is generated and this vibration is transmitted through the clutch to the transmission shaft and the other parts of the driving mechanism. The torsional vibration generated by the motor causes the driving load to be applied to and released from the transmission shaft intermittently so that the shaft is not continuously under load tension but is subjected to intermittent pick-up and release which results in gear chatters or rattles in the transmission which interfere with the rhythm of a perfectly operating mechanism.

Attempts have been made heretofore to correct this condition by employing a clutch transmitting element which is intended to absorb and dampen the torsional vibration of the motor and such elements have included rubber blocks, coil springs and other expedients of that sort interposed between the rim which carries the friction material and the hub, the load being transmitted through these resilient parts to the hub. So far as I am aware, the transmitting elements of the construction mentioned have not been wholly satisfactory for the purpose since in their commercial form they do not operate efficiently at the different periods of the motor or, when used with motors in which the vibration occurs at relatively low motor speeds, they do not function to any substantial extent because of their inherent stiffness at a neutral position due to their construction.

The object of the present invention is to provide a transmitting element which comprises a resilient connection between its rim and its hub so constructed and arranged that it absorbs and dampens out motor vibration and shocks arising from faulty manipulation of the clutch. This resilient connection has a yield range in excess of the amplitude of greatest torsional vibration generated by the motor with which the clutch is to be used and consequently absorbs or dampens out all the vibration before it is transmitted to the transmission shaft, so that the latter operates under a load in either direction at all times. The new connection may be constructed to be effective regardless of the period in the operation of the motor at which the vibration occurs and if the periods of vibration in driving and coasting are different, as is frequently the case, the new element can be constructed to operate efficiently under such variable conditions.

The new element comprises a hub, internally splined and having a circumferential flange provided with spaced pockets, and a disc portion carrying facings or mats of friction material at its rim and having a central opening through which the hub extends. The disc portion and the hub are connected together by rivets or the like and the connection permits the parts a limited freedom of relative angular movement. Mounted in each pocket in the flange and projecting outwardly radially therefrom is a bundle of leaf springs, the outer end of each bundle being received in a notch in the edge of the central opening in the disc. These spring bundles resist the relative angular movement of the hub and disc and the walls of the pockets and notches are curved so that the bundles may flex under load applied during driving or coasting and thus absorb vibration generated in the motor or sudden shocks due to faulty handling of the clutch. The spring leaves in the bundles lie substantially at right angles to the plane of the disc and project beyond the faces thereof, so that the forces tending to flex the springs are applied substantially at right angles to the plane of the individual leaves.

The disc of the element is preferably so formed as to provide a discontinuous rim on which the flat rings or mats of friction material are mounted and I find it advantageous in many ways to employ a disc fabricated of a plurality of individual spokes, on the free ends of which the mats or mat are mounted. The inner or hub ends of the spokes may be enlarged to contact and form a continuous central portion with a central opening for the main hub. Preferably the hub ends of the spokes in such a fabricated structure are secured between a pair of rings riveted or otherwise secured to opposite faces of the hub ends of the spokes, these rings projecting inward beyond the ends of the spokes to lie close to the surface of the main hub and having flaring notches in which the spring bundles lie. With this arrangement each spring bundle is seated at one end in a flaring pocket in the hub flange and at its other end in a notch in the hub end of a spoke, and the flaring notch in the rings provided for this bundle overlaps the pocket.

The fabricated spoke type of disc may include insulating material at the inner ends of the spokes and the disc tends to absorb and dampen vibrations of low amplitude, even when used without the spring bundles, by reason of its flexibility and yielding qualities.

The transmitting element of the invention includes numerous other features of novelty which will be more readily understood from a consideration of the drawings, in which Fig. 1 is a face view of the element with certain parts broken away and shown in section;

Fig. 4 is a sectional view on the line 4—4 of Fig. 1;

Fig. 5 is a sectional view on the line 5—5 of Fig. 1; and

Figure 1:
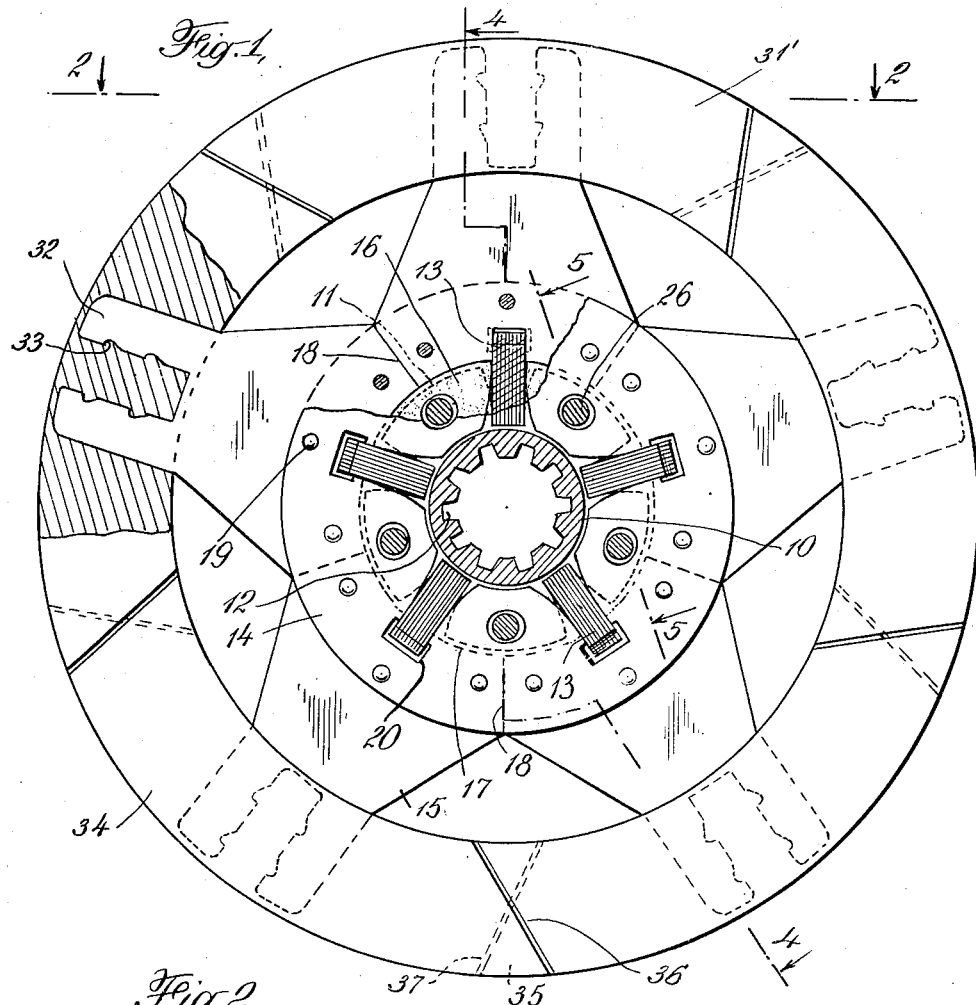

Figs. 6, 7, and 8 are diagrammatic views illustrating the operation of the vibration dampener.

Figure 9 is a sectional view similar to Figure 6 and illustrates a modified form of the pockets and notches.

Referring now to the drawings, the element comprises a hub 10 of the usual construction provided with a circumferential flange 11. The hub is provided with the usual integral splines 12 by which it may be operatively connected to the transmission shaft. The flange 11 of the hub is provided with a plurality of recesses in which are mounted laminated bundles 13 of leaf springs, each bundle being seated at one end in a recess and projecting outwardly beyond the surface of the hub flange.

The element illustrated has a disc of the fabricated spoke type and it is made up of a plurality of spokes 15, the enlarged inner ends of which cooperate to form a hub portion having a central opening through which the hub 10 extends. The hub ends of the spokes are engaged on opposite faces by flat rings or washers 14, which are thin and somewhat flexible at an angle to their plane. The washers project inwardly beyond the hub ends of the spokes defining a channel in which lies a ring 16 of heat insulating material, the inner edge of which contacts with the outer surface of hub 10. The inner edges of the spokes are arcuate as indicated at 17 to conform to the outer surface of the heat-insulating ring and lie in contact therewith. The side edges 18 of the hub ends of adjacent spokes lie in abutting contact so that when the spokes are assembled in position between the rings 14, they contact laterally to form a continuous circular base having a central opening, the wall of which closely fits the outer surface of the ring 16. The spokes are held in position between the rings 14 by rivets 19.

Each spoke has a notch cut in its base to receive the projecting end of a spring bundle 13, and the washers 14 are cut away to form notches, the sides of which flare on a curve. The walls of the pockets in the hub flange are also flared on a curve and since the rings terminate close to the outer surface of the hub, the flaring notches in the rings and the flaring pockets in the flange overlap as illustrated more clearly in Figs. 6, 7, and 8 to be discussed later. The metal of the washers adjacent the cut may be folded back to form beads 20 around the openings, if desired.

The inner ends of the spring bundles are held against lateral displacement in one direction by means of a tanged hub companion flange 21 which is provided with projecting sectors 22 of arcuate shape. This flange is mounted on and tanged to the hub but separated from the recessed hub flange by the disc. Each sector 22 has a length about equal to the distance between a pair of spring bundles and the bundles are held by the hub companion flange 21 against lateral displacement without being rigidly confined. The companion flange and sectors 22 may be formed as a single integral unit or the sectors may be formed separately from the flange and secured thereto by spot welding, riveting, or in any other suitable manner. The companion flange with its sectors is mounted on the hub and keyed thereto by means of internally splined teeth 23 which are received in keyways 24 equally spaced around the outer surface of the hub. The companion flange is thus free to be moved axially of the hub to take its proper position, but when mounted in place on the hub, is held against rotational movement relative thereto.

A second spring keeper ring 25 is mounted on the opposite end of the hub against the face of the hub flange and serves to hold the spring bundles against lateral displacement from the recesses in the hub flange at that side. Passing through the companion flange 21 and ring 25 are shoulder rivets 26. These rivets also pass through enlarged openings in the metal rings 14 and heat-insulating ring 16, and the rivets space the parts so as to prevent their binding. The openings through the rings through which the rivets pass are elongated so that the disc is free to move relative to the hub angularly, such movement, however, being resisted by the action of the spring bundles.

The walls of the flange pockets and the notches in rings 14 in which the ends of the spring bundles are received are flaring and have a curvature or shape which conforms generally to the natural curve generated by the bundles under flexure. The shape or curvature will be more readily apparent from a consideration of Figs. 6, 7, and 8, where it will be seen that the outer end 26' of a spring bundle is seated in a notch formed in rings 14 and the base of a spoke, while its inner end 27 is seated in a pocket in the hub flange, part of the pocket being defined by the ends of the arcuate flanges 22 on the ring 21. The walls of the notches are parallel for a short distance and then diverge either with straight flaring sides or with a uniform curvature. Similarly, the walls of each pocket have parallel portions at the base of the pocket and then diverge as described.

When the disc is subjected to a driving load, the wall 28 of the outer notch tends to force the outer end of the spring bundle (Fig. 6) to the left, and this movement is resisted by the diagonally opposite wall 29 of the pocket. The walls 28 and 29 are thus the driving abutments and due to the particular shape of these surfaces, the spring bundle flexes under load and assumes the form shown in Fig. 7. Since the abutments have a shape which closely conforms to the curve assumed by the outer faces of the spring bundle under flexure, the leaves of the bundle are not subjected to a shearing stress when load is applied but are supported by abutments which are variable in action; that is, when the disc is at rest, the spring bundle is in contact only with the parallel portions of the wall of each pocket and notch, but when load is applied and the bundle begins to flex, the driving abutment 28 contacts to an increasing extent with the surface of the spring bundle and an increased contact of the bundle with the surfaces 29 also occurs. The curvature of the surface results in a greater contact with greater load and the contact areas approach each other as the load increases.

When the vehicle is coasting the power is transmitted from the surface 30 of the pocket through the spring bundle to the surface 31 of the notch, and by reason of the curvature given these surfaces, the same variable abutment action previously described takes place and shearing stresses are avoided.

The shape assumed by the spring bundle under load is illustrated in Fig. 7 and the shape assumed during coasting is illustrated in Fig. 8.

The shape given the walls of the pockets and notches determines the yield range of each spring bundle, and in order to insure that torsional vibration generated in the motor will not be transmitted to the hub of the element and thence to the transmission shaft, the pockets and notches in the element are so formed that the yield range permitted is in excess of the maximum amplitude of torsional vibration. When that condition obtains, it will be apparent that torsional vibration generated by the motor merely causes a flexure of the spring bundles but the vibration is not transmitted to the hub. The vibration is dampened by the bundles due to flexing and interleaf friction of the springs, the leaves of the bundles wiping against each other under tension so that the vibration is absorbed in overcoming friction within the bundles.

Since in some motors, the period of torsional vibration during driving is different from the period during coasting, the driving surfaces of the pockets and notches in a clutch used with such motors have a shape different from that of the coasting surfaces, but in each instance, the yield of the springs must be in excess of the maximum amplitude of torsional vibration generated by the motor. This variation in the action of the vibration dampener during driving and coasting is accomplished without affecting the load that can be transmitted through the dampener. Where the vibration occurs at different speeds in driving and coasting, the driving and coasting surfaces of the pockets and notches will have different shapes as shown in Figure 9. In this figure, which is similar in other respects to Figure 6, the pockets in the hub are formed with a side 59 which is of a different curvature from the side 60 and the sides 62 and 63 of the recess are correspondingly different so that the coacting pair of sides of each pocket and notch have a similar curvature, but the opposite pair of sides are of a different curvature. Thus sides 59 and 63 have a similar curvature and sides 60 and 62 have a similar curvature.

In certain motors the period of vibration occurs at a relatively low speed and when a light load is being transmitted through the element. To take care of that condition, the leaves of the spring bundles may be made relatively flexible so that the bundles yield under the relatively light load and thus absorb the torsional vibration.

Mounted on the outer ends of the spokes are rings 31' of friction material, and the spoke ends are bifurcated to form two legs 32, the inner walls of which preferably are serrated as at 33 to make a more binding engagement with the friction material. The friction material may be either molded on the ends of the spokes or may be a woven friction fabric provided with pockets in which the bifurcated spoke ends are received.

Figure 2:
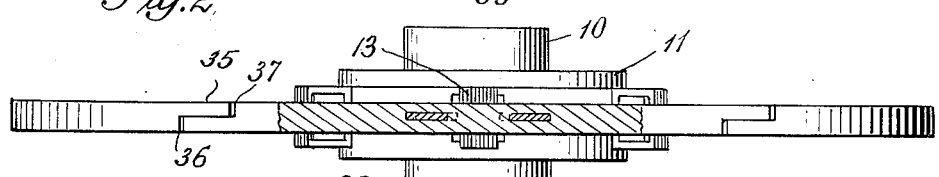
Fig. 2 is a sectional view on the line 2—2 of Fig. 1.

In the construction shown in Fig. 1, the ring 31 is made of fibre molded on the ends of the spokes. The ring is not continuous but is made in the form of a series of arcuate sections 34, one on each spoke. The sections have overlapping portions 35, as indicated in Fig. 2, these portions being so formed as to provide a pair of joints 36 and 37 intersecting each other and lying between adjacent spokes. The ends of the sections are not connected together and thus the ring has substantial flexibility so that it conforms to inequalities in the surface of the fly wheel and presser plate and compensates for faulty manufacture or installation. Preferably a suitable lubricant or anti-friction material is inserted between the faces of the overlapping portions of the sections to prevent the sections from sticking together during the processing of the material under heat and pressure.

Figure 3:
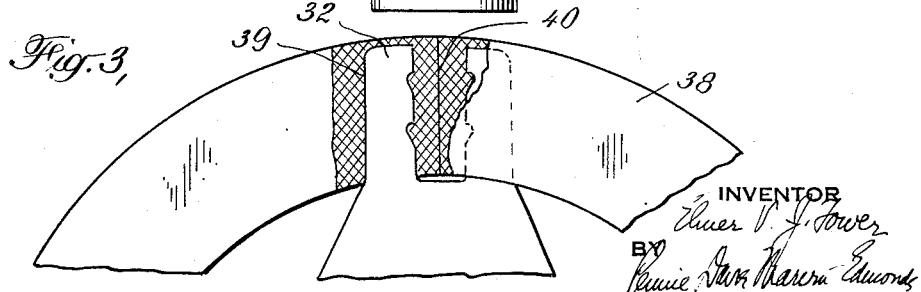
Fig. 3 is a fragmentary face view with parts broken away.

In Fig. 3 the friction ring 38 is a length of woven fabric with spaced pockets 39 woven in it and receiving the bifurcated ends 32 of the spokes. These pockets are formed during weaving of the multi-ply fabric and a suitable length of the fabric which is woven on a curve is mounted on the ends of the spokes, the ends of the ring, as at 40, lying between the two end portions of one spoke. The ring 38 is under tension when it is mounted in place and it is impregnated or otherwise processed after mounting so that it is held firmly in position and does not wrinkle, loosen, or bulge. By using the woven construction and mounting it on the bifurcated spoke ends in the manner described, no rivets, stitching, or other fastening means are required for holding it in position and the free ends of the ring between the end members of the spoke at the joint are so short that they do not become displaced in use.

The rings 14 are relatively flexible about an axis lying in the plane of a disc so that the spoke structure is flexible and yieldable and thus tends of itself to dampen and absorb vibrations which would otherwise be transmitted to the driving mechanism. By the use of the heat-insulating ring 16, heat generated by slippage of the clutch is to a considerable extent prevented from passing on to the hub and the open spoke structure permits air to pass through the disc, so that heat is readily dissipated.

This application is a continuation in part of my copending application, Serial No. 349,933, filed March 26, 1929, which application has matured into Patent No. 1,965,325 granted July 3, 1934.

I claim:

1. A transmitting element for use in a clutch which comprises a hub having a circumferential flange provided with a plurality of angularly spaced recesses, a plurality of leaf spring elements one for each recess having a portion seated in the recess and another portion lying exposed outside the recess, a disc having an opening through which the hub extends, the disc including a pair of rings on opposite faces thereof in part defining said central opening, said rings having recesses to receive the exposed portions of said spring elements, means securing the disc and hub together and permitting them a limited degree of relative angular movement, the spring elements being flexed in and resisting said movement, friction material carried by the disc and means engaging the opposite sides of said spring elements to prevent their lateral displacement.

2. A transmitting element for use in a clutch which comprises a hub having a circumferential flange provided with angularly spaced recesses, a plurality of leaf spring elements one for each recess, each element having a portion seated in said recess and another portion projecting laterally from said recess, a disc having a central opening through which the hub extends, the opening in said disc being of less diameter than the flange and the disc having recesses in which the laterally projecting portions of said spring elements are received, means securing the disc and hub together to prevent their complete separation while permitting them a limited freedom of relative angular movement, said spring elements being flexed in and resisting said movement, and friction material carried by said disc.

3. A transmitting element for use in a clutch which comprises a hub having a circumferential flange provided with angularly spaced recesses, a plurality of leaf spring elements one for each recess, each element having a portion seated in said recess and another portion projecting laterally from said recess, a disc having a central opening through which the hub extends, the opening in said disc being of less diameter than the flange and the disc having recesses in which the laterally projecting portions of said spring elements are received, a companion flange mounted on said hub and having recesses receiving portions of said spring elements projecting laterally beyond the recesses in said disc, means for securing the disc and hub together to prevent their complete separation while permitting them a limited freedom of relative angular movement, the spring elements being flexed in and resisting said movement, and friction material carried by said disc.

4. A power transmitting element adapted to absorb and dampen vibrations received from the driving element which comprises a hub having a circumferential flange provided with angularly spaced recesses, a plurality of leaf spring elements one for each recess, each element having a portion seated in said recess and another portion projecting laterally from said recess, a disc having a central opening through which the hub extends, the opening in said disc being of less diameter than the flange and the disc having recesses in which the laterally projecting portions of said spring elements are received, a companion flange mounted on said hub and having recesses receiving portions of said spring elements projecting laterally beyond the recesses in said disc, means for securing the disc and hub together to prevent their complete separation while permitting them a limited freedom of relative angular movement, the spring elements being flexed in and resisting said movement, and driving means carried by said disc.

ELMER V. J. TOWER.